United States Patent
Lee et al.

(10) Patent No.: US 10,408,616 B2
(45) Date of Patent: Sep. 10, 2019

(54) METHOD FOR ACQUIRING SENSOR DATA AND ELECTRONIC DEVICE THEREOF

(71) Applicant: SAMSUNG ELECTRONICS CO., LTD., Suwon-si, Gyeonggi-do (KR)

(72) Inventors: Jung-Eun Lee, Suwon-si (KR); Yong-Sang Yun, Suwon-si (KR); Chi-Hyun Cho, Suwon-si (KR); Jong-Chul Choi, Suwon-si (KR); Chang-Ryong Heo, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 563 days.

(21) Appl. No.: 14/862,270

(22) Filed: Sep. 23, 2015

(65) Prior Publication Data

US 2016/0084647 A1    Mar. 24, 2016

(30) Foreign Application Priority Data

Sep. 24, 2014   (KR) .................. 10-2014-0127666

(51) Int. Cl.
*G01B 21/00*    (2006.01)
*G01C 25/00*    (2006.01)
(Continued)

(52) U.S. Cl.
CPC .......... *G01B 21/00* (2013.01); *G01C 25/00* (2013.01); *G02B 27/017* (2013.01); *H04N 13/327* (2018.05); *H04N 13/332* (2018.05); *G02B 2027/014* (2013.01); *G02B 2027/0132* (2013.01); *G02B 2027/0138* (2013.01); *G02B 2027/0181* (2013.01); *G02B 2027/0187* (2013.01)

(58) Field of Classification Search
CPC ........ G01B 21/00; G01C 25/00; G02B 27/07; G02B 2027/0132; G02B 2027/014; G02B 2027/0181; G02B 2027/0187; G02B 27/017; G02B 27/01; H04N 13/327; H04N 13/332; H04N 13/0425; H04N 13/0429
USPC ......................................... 73/1.79
See application file for complete search history.

(56) References Cited

U.S. PATENT DOCUMENTS 8,976,086 B2 * 3/2015 Hilkes .................. G09G 5/00
                                                345/8
9,767,609 B2 * 9/2017 Eade .................. G06T 19/006
(Continued)

FOREIGN PATENT DOCUMENTS

CN       103380625       10/2013
CN       104067160        9/2014
(Continued)

OTHER PUBLICATIONS

Extended Search Report dated Feb. 17, 2016 in counterpart European Application No. 15186482.4.
(Continued)

*Primary Examiner* — Marrit Eyassu
(74) *Attorney, Agent, or Firm* — Nixon & Vanderhye, P.C.

(57) ABSTRACT

An example electronic device calibrates a center of a sensor for acquiring sensing data differently according whether the electronic device is worn on a part of a user body or not, and provides data sensed based on a result of the calibrating to the user, so that more exact and/or accurate data and a better sense of use can be provided to the user.

5 Claims, 17 Drawing Sheets

(51) Int. Cl.
  *G02B 27/01* (2006.01)
  *H04N 13/332* (2018.01)
  *H04N 13/327* (2018.01)

(56) References Cited

U.S. PATENT DOCUMENTS

| | | | |
|---|---|---|---|
| 2002/0113755 A1* | 8/2002 | Lee | G02B 7/12 345/7 |
| 2010/0079356 A1 | 4/2010 | Hoellwarth | |
| 2010/0103077 A1* | 4/2010 | Sugiyama | G02B 27/017 345/8 |
| 2013/0106674 A1* | 5/2013 | Wheeler | G02B 27/017 345/8 |
| 2013/0106847 A1* | 5/2013 | Sugiyama | G03H 1/2294 345/419 |
| 2013/0120224 A1 | 5/2013 | Cajigas et al. | |
| 2013/0128364 A1* | 5/2013 | Wheeler | A61B 3/113 359/630 |
| 2013/0235169 A1 | 9/2013 | Kato et al. | |
| 2013/0241805 A1 | 9/2013 | Gomez | |
| 2014/0055846 A1 | 2/2014 | Wheeler et al. | |
| 2014/0062854 A1 | 3/2014 | Cho | |
| 2014/0160170 A1* | 6/2014 | Lyons | G09G 5/38 345/676 |
| 2014/0191927 A1* | 7/2014 | Cho | G02B 27/017 345/8 |
| 2014/0198017 A1 | 7/2014 | Lamb et al. | |
| 2014/0333666 A1* | 11/2014 | Poulos | G06T 19/006 345/633 |
| 2015/0015458 A1* | 1/2015 | Cho | G02B 27/017 345/8 |
| 2015/0301337 A1* | 10/2015 | Park | G06F 3/013 345/8 |
| 2015/0370072 A1* | 12/2015 | Lee | G02B 27/0172 345/8 |
| 2016/0349511 A1* | 12/2016 | Meiron | G06F 3/011 |
| 2017/0364325 A1* | 12/2017 | Lee | G02B 27/017 |

FOREIGN PATENT DOCUMENTS

| | | |
|---|---|---|
| CN | 104919398 | 9/2015 |
| KR | 10-2014-0001167 | 1/2014 |
| KR | 10-2014-0029901 | 3/2014 |
| KR | 10-2014-0035861 | 3/2014 |
| WO | 2014/035118 | 3/2014 |

OTHER PUBLICATIONS

Search Report dated Feb. 19, 2016 in counterpart International Patent Application No. PCT/KR2015/010050.
Written Opinion dated Feb. 19, 2016 in counterpart International Patent Application No. PCT/KR2015/010050.
Office Action dated Mar. 16, 2017 in counterpart European Patent Application No. 15186482.4.
Office Action dated Jul. 1, 2019 in counterpart Chinese Patent Applicaiton No. 201580044970.4 and English-language translation.

* cited by examiner

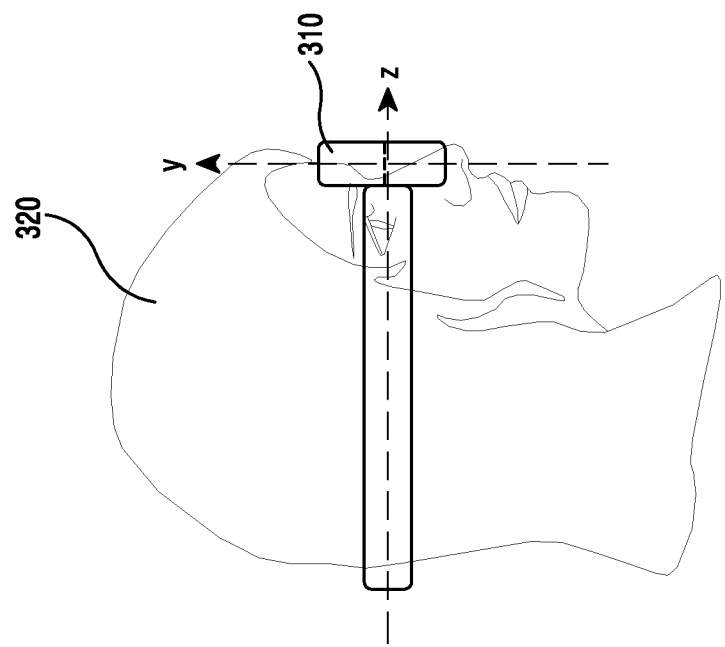
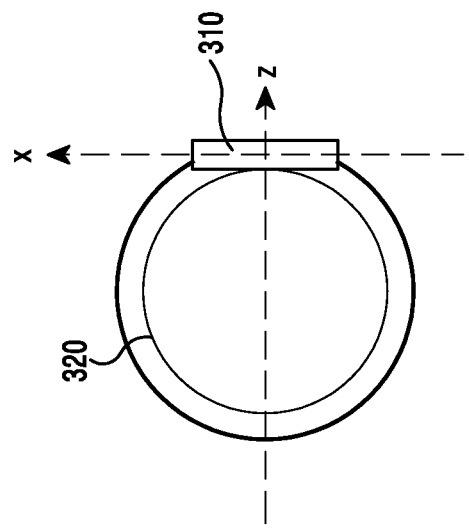
FIG.3A
FIG.3B

METHOD FOR ACQUIRING SENSOR DATA AND ELECTRONIC DEVICE THEREOF

CROSS-REFERENCE TO RELATED APPLICATION

This application is based on and claims priority under 35 U.S.C. § 119 to Korean Application No. 10-2014-0127666, filed on Sep. 24, 2014 in the Korean Intellectual Property Office, the disclosure of which is incorporated by reference herein in its entirety.

BACKGROUND

Various example embodiments described in the present disclosure relate to an apparatus and method for controlling a wearable electronic device.

In electronic devices, a variety of sensors, such as a gyro sensor, a geomagnetic sensor, an acceleration sensor, a Global Positioning System (GPS) sensor, a tilt sensor, and the like, may be utilized. The gyro sensor may be utilized, for example, to measure aspects of rotation of a mobile terminal and determine a direction based thereon. The geomagnetic sensor may be utilized, for example, to measure aspects of a bearing of the mobile terminal. The acceleration sensor may be utilized, for example, to measure shaking or aspects of motion of the mobile terminal. The GPS sensor may be utilized, for example, to determine aspects of a location of the mobile terminal. The tilt sensor may be utilized, for example, to measure aspects of tilt when the mobile terminal is rotated or laid down.

The above-described various sensors may be included within the housing of the electronic device. Since sensors incorporated in the housing of the electronic device are generally not located at the exact center of the electronic device, calibration is often desirable to derive more accurate or exact sensor values.

SUMMARY

An existing method sets a sensing reference point of a sensor based on the center of the electronic device. Most electronic devices wearable on a body collect data with reference to the electronic device, and provide convenience to users. However, when data is collected with reference to the center of the electronic device, error may be caused, for example, by differences between motion of the center of the electronic device and a real motion of a user wearing the electronic device.

To address these deficiencies, example apparatuses and methods described herein correct sensor data (e.g., sensor values) according to a location at which an electronic device is worn by a user.

The example apparatuses and methods described herein can calibrate a sensing reference point of a wearable electronic device according to a location at which the electronic device is worn, and provide operation of a sensor which is based on a user (for example, a body or body part of the user).

The example apparatuses and methods described herein can calibrate a center of a sensor so that sensing data is processed differently according to whether an electronic device is worn on a part of a user body, and provide data sensed based on the calibrating to a user.

According to a non-limiting example described in the present disclosure, an operation method of an electronic device includes: determining a center point of a body part on which the electronic device is mounted, and acquiring data from a sensor with reference to the center point of the part.

According to another non-limiting example described in the present disclosure, an operation method of an electronic device includes: detecting a change in a sensing reference point for acquiring sensor data; determining a center point for calibrating the sensing reference point; calibrating the sensing reference point to correspond to the determined center point; and acquiring sensor data with reference to the calibrated sensing reference point.

According to another non-limiting example described in the present disclosure, an electronic device includes: a sensor; and a processor configured to determine a center point of a body part on which the electronic device is mounted, and acquire data from the sensor with reference to the center point of the part.

According to another non-limiting example described in the present disclosure, an electronic device includes: a sensor; a memory; and a processor operatively connected with the sensor and the memory. The processor is configured to determine, when a change in a sensing reference point for acquiring sensor data is detected, a center point for calibrating the sensing reference point, calibrate the sensing reference point to correspond to the determined center point, and acquire sensor data with reference to the calibrated sensing reference point.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 3A and 3B are views showing examples of a wearable electronic device;

DETAILED DESCRIPTION

Figure 1:
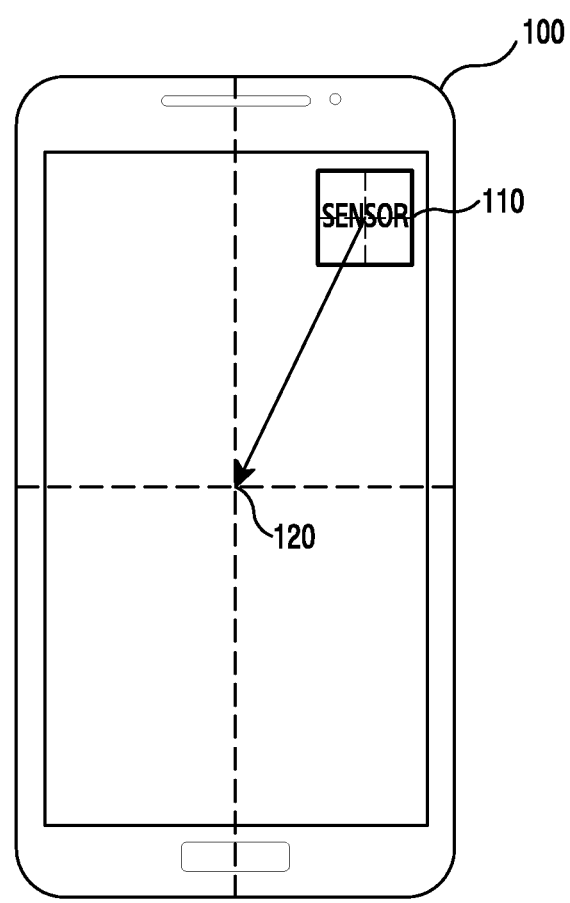
FIG. 1 is a view for explaining sensor calibration in an electronic device according to an example embodiment.

Hereinafter, various example embodiments of the present disclosure will be described with reference to the accompanying drawings.

The present disclosure may have various example embodiments, and modifications and changes may be made therein. Therefore, the present disclosure will be described in detail with reference to particular non-limiting, example embodiments shown in the accompanying drawings. However, it should be understood that the present disclosure is not limited to the particular example embodiments, but includes all modifications, equivalents, and/or alternatives within the spirit and scope of the present disclosure. In the description of the drawings, similar reference numerals may be used to designate similar elements.

The term "include" or "may include" refers to the existence of a corresponding disclosed function, operation or component which can be used in various example embodiments of the present disclosure and does not limit the addition of one or more other functions, operations, or components. Further, as used in various example embodiments of the present disclosure, the terms "include", "have", and their conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

Further, as used in various example embodiments of the present disclosure, the expression "or" includes any or all combinations of words enumerated together. For example, the expression "A or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, without departing from the scope of the present disclosure, a first component element may be named a second component element. Similarly, the second component element also may be named the first component element.

When an element is referred to as being "coupled" or "connected" to any other element, it should be understood that not only the element may be coupled or connected directly to the other element, but also a third element may be interposed therebetween. Contrarily, when an element is referred to as being "directly coupled" or "directly connected" to any other element, it should be understood that no element is interposed therebetween.

The terms as used in various example embodiments of the present disclosure are used merely to describe certain embodiments and are not intended to limit the present disclosure. As used herein, singular forms may include plural forms as well unless the context explicitly indicates otherwise. Furthermore, all terms used herein, including technical and scientific terms, have the same meaning as commonly understood by those of skill in the art to which the present disclosure pertains. Such terms as those defined in a generally used dictionary are to be interpreted to have the meanings corresponding to the contextual meanings in the relevant field of art, and are not to be interpreted to have ideal or excessively formal meanings unless clearly defined in various example embodiments of the present disclosure.

An electronic device according to various example embodiments described herein may be a device including a communication function. The electronic device according to various example embodiments of the present disclosure may, for example, include at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (e.g., a head-mount-device (HMD) such as electronic glasses, electronic clothing, an electronic bracelet, an electronic necklace, an electronic accessory, an electronic tattoo, or a smart watch), a television, a digital video disk (DVD) player, an audio player, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an artificial intelligence robot, a Television (TV), an electronic dictionary, an electronic key, a camcorder, medical equipment (e.g., a magnetic resonance angiography (MRA) machine, a magnetic resonance imaging (MRI) machine, a computed tomography (CT) scanner, or an ultrasonic machine), a navigation device, a global positioning system (GPS) receiver, an event data recorder (EDR), a flight data recorder (FDR), a vehicle infotainment device, electronic equipment for a ship (e.g., ship navigation equipment and a gyrocompass), avionics, security equipment, an industrial or home robot, a part of furniture or building/structure, an electronic board, an electronic signature receiving device, a projector, and various measuring instruments (e.g., a water meter, an electricity meter, a gas meter, or a wave meter). An electronic device according to example embodiments of the present disclosure may also be a device including a fingerprint recognition sensor. The electronic device according to various example embodiments of the present disclosure may be a combination of one or more of the aforementioned various devices. Further, the electronic device according to various embodiments of the present disclosure may be a flexible device. Further, it will be apparent to those skilled in the art that the electronic device according to various example embodiments of the present disclosure is not limited to the aforementioned devices.

Hereinafter, an example electronic device will be described with reference to the accompanying drawings. The term "user" as used in various example embodiments may indicate a person who uses an electronic device or a device (e.g., artificial intelligence electronic device) that uses an electronic device.

FIG. 1 is a view for explaining sensor calibration in an electronic device according to an example embodiment.

When the center of a sensor 110 deviates from the center 120 of the electronic device 100 as shown in FIG. 1, the electronic device 100 may calibrate a sensing reference point of the sensor 110 to correspond to the center 120 of the electronic device 100. The sensing reference point of the sensor 110 may be calibrated by the electronic device 100 identifying a user center point, calculating a difference between a current center point and the user center point, and changing the sensing reference point based on the difference.

Recently, electronic devices are provided as devices which are wearable on a body (for example, as a wearable device). For example, the electronic device 100 may provided in various forms which are attachable to and detachable from a body or clothing, such as a head-mounted display or head-mounted glasses, a watch or a wristband which is wearable on a wrist, a contact lens type, a ring type, a shoe type, a clothing type, etc. Electronic device 100 may be provided as a wearable device, so that inconvenience carrying the electronic device can be reduced and accessibility of use can be enhanced in comparison with other existing electronic devices.

Figure 2A:
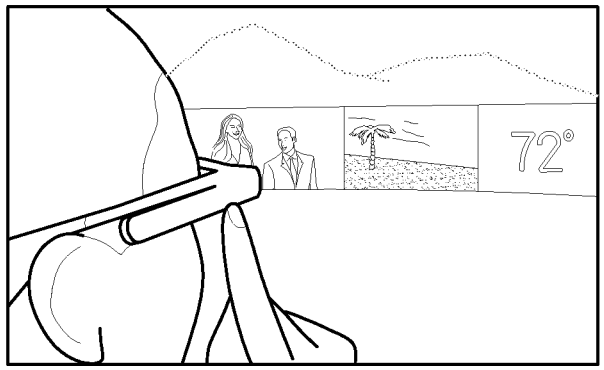
FIGS. 2A and 2B are views showing examples of a head-mounted type electronic device.
Figure 2B:
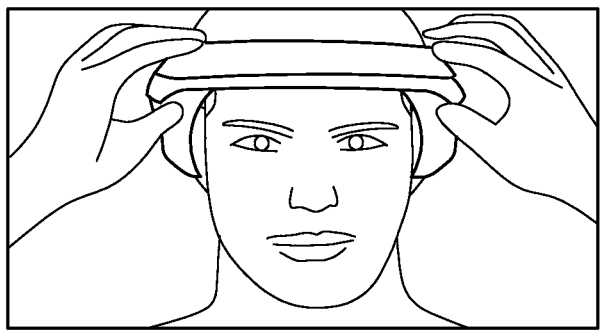
Figure 2B:
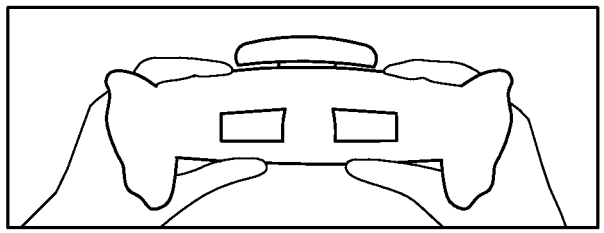

FIGS. 2A and 2B are views showing examples of a head-mounted type electronic devices.

In recent years, many head-mounted type electronic device (for example, a Head-Mounted Display (HMD), a Head-Mounted Theater (HMT)) (hereinafter, referred to as an electronic device or an external device) have been released. These devices may be divided into see-through types which provide Augmented Reality (AR) and non-see-through types which provide Virtual Reality (VR).

FIG. 2A illustrates an example of an external device of the see-through type. The see-through type may synthesize or combine virtual objects or things with the real world as viewed using a camera. In this way, the view of the real world may be augmented with additional information which is provided to the user in an intuitive and easy-to-understand manner.

FIG. 2B illustrates an example of an external device of the non-see-through type. The non-see-through type is an electronic device with one or more displays to be placed in front of user's eyes, and allows the user to enjoy "virtual" contents (for example, a game, a movie, streaming, broadcasting, etc.) provided through an external input.

FIGS. 3A and 3B are views showing examples of a user wearing an example external device.

FIG. 3A is a side-view of a user 320 wearing an example external device 310, and FIG. 3B is a corresponding top-down view.

The external device 310 may include an electronic device (not shown), and may be a device which is wearable on a body (for example, a head) (for example, an HMD or an HMT). The user 320 may be provided with an augmented reality or virtual reality service by wearing the external device 310.

Figure 4:
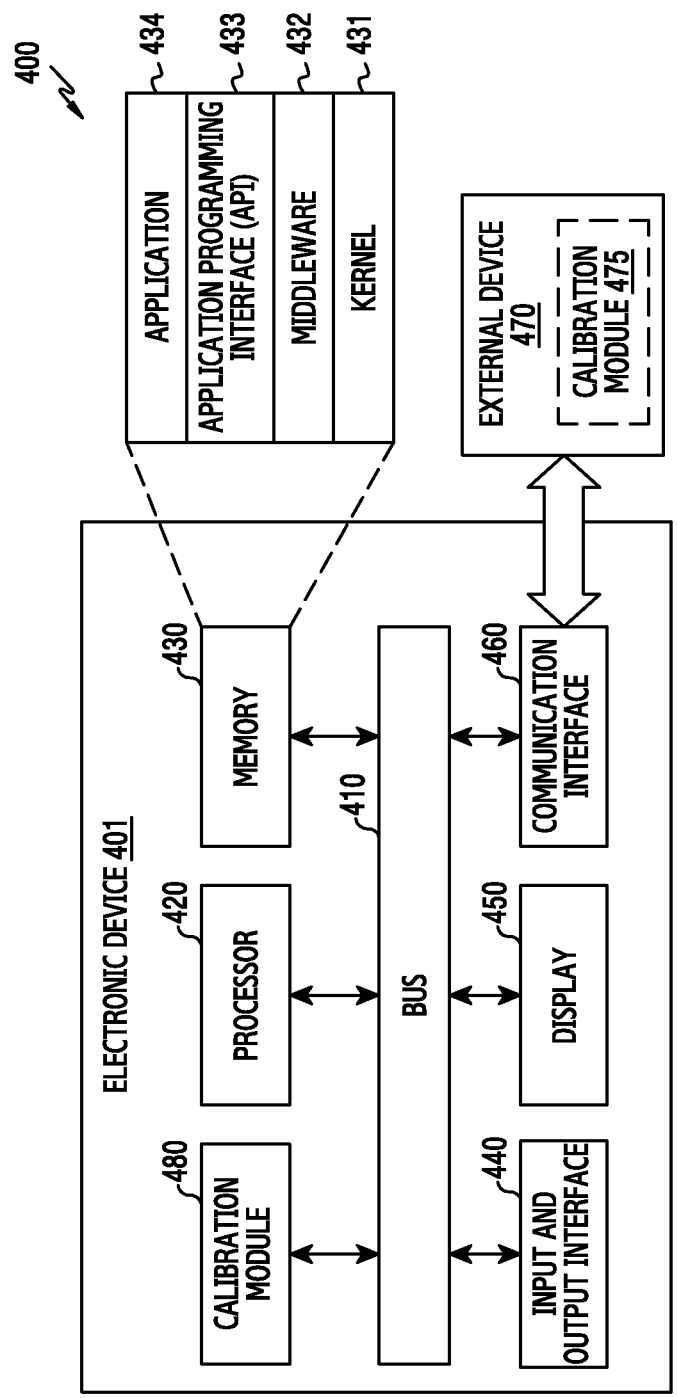
FIG. 4 shows an illustrative network environment including an example electronic device.

FIG. 4 shows an illustrative network environment including an example electronic device.

Referring to FIG. 4, the network environment 400 may include an electronic device 401 and an external device 470. According to an example embodiment, the electronic device 401 may include a bus 410, a processor 420, a memory 430, an input and output interface 440, a display 450, a communication interface 460, and a calibration module 480. In an example embodiment, the external device 470 may be an HMD or an HMT and include a calibration module 475.

The bus 410 may be a circuit which connects the above-described elements of example electronic device 401 with one another and transmits communications (for example, a control messages) between these elements.

The processor 420 may receive/transmit instructions from/to the other elements (for example, the memory 430, the input and output interface 440, the display 450, the communication interface 460, the calibration module 480 and/or etc.) via the bus 410, decipher, decode, etc. received instructions, and perform calculations or data processing according to the instructions.

The memory 430 may store instructions or data which is received from or generated by the processor 420 and/or the other electronic device elements (for example, the input and output interface 440, the display 450, the communication interface 460, the calibration module 480, etc.). The memory 430 may include programming modules such as a kernel 431, middleware 432, an Application Programming Interface (API) 433, an application 434, and the like. Each of the above-described programming modules may be configured as software, firmware, hardware, or a combination of two or more of these.

The kernel 431 may control or manage system resources (for example, the bus 410, the processor 420, the memory 430, and the like) which are used for performing operations or functions implemented in the other programming modules, for example, the middleware 432, the API 433, and/or the application 434. In addition, the kernel 431 may provide an interface for allowing the middleware 432, the API 433, and/or the application 434 to access an individual element of the electronic device 401 and control or manage the element.

The middleware 432 may serve as an intermediary to allow the API 433 and/or the application 434 to communicate with the kernel 431 and exchange data with the kernel 431. In addition, the middleware 432 may perform operations (for example, scheduling or load balancing) with respect to work requests received from the application 434, for example, by giving priority to use the system resources of the electronic device 401 (for example, the bus 410, the processor 420, the memory 430, and the like) to at least one of the applications 434.

The API 433 may be an interface for allowing the application 434 to control a function provided by the kernel 431 and/or the middleware 432, and, for example, may include at least one interface or function (for example, instructions) for controlling a file, controlling a window, processing an image, or controlling text.

According to an example embodiment, the application 434 may include a Short Message Service (SMS)/Multimedia Messaging Service (MMS) application, an email application, a calendar application, a notification application, a health care application (for example, an application for measuring exercise or a blood sugar), an environment information application (for example, an application for providing information on atmospheric pressure, humidity, or temperature), and the like. Additionally or alternatively, the application 434 may be an application related to information exchange between the electronic device 401 and the external device 470 (for example, an HMT, an HMD and the like). For example and without limitation, an application related to information exchange may be a notification relay application for relaying specific information to the external device 470 or a device management application for managing the external device 470.

For example, the notification relay application may include a function of relaying notification information generated by other applications of the electronic device 401 (for example, the SMS/MMS application, the email application, the health care application, the environment information application, and the like) to the external device 470 (for example, an HMT, an HMD and the like). Additionally or alternatively, the notification relay application may receive notification information from the external device 470 and may relay the same to the user. For example, the device management application may manage (for example, install, delete or update) a function regarding at least part of the external device 470 communicating with the electronic device 401 (for example, turning on/off the external device (or some parts thereof) or adjusting brightness (or resolution) of a display thereof (not shown)), an application operating in the external device 470 or a service provided by the external device 470 (for example, a calling service or a message service).

According to various example embodiments, the application 434 may include an application which is specified according to an attribute (for example, a kind or type) of the external device 470. For example, when the external device is an MP3 player, the application 434 may include an application related to music replay. Similarly, when the external device 470 is a mobile medical device, the application 434 may include an application related to health care. According to an example embodiment, the application 434 may include at least one of an application specified by the electronic device 401 or an application received from an external device (for example, a server (not shown) or an HMT device).

The input and output interface 440 may transmit instructions or data input by a user through an input and output device (for example, a sensor, a keyboard or a touch screen) to the processor 420, the memory 430, the communication interface 460, and/or the calibration module 480 through the bus 410, for example. For example, the input and output interface 440 may provide data (e.g., coordinate-related data) on a user's touch input through a touch screen to the processor 420. In addition, the input and output interface 440 may output instructions or data received from the processor 420, the memory 430, the communication interface 460, and/or the calibration module 480 through the bus 410 through an input and output device (for example, a speaker and/or a display). For example, the input and output interface 440 may output voice data processed through the processor 420 to the user through a speaker.

The display 450 may display a variety of information (for example, multimedia data, text data, and the like) to the user.

The communication interface 460 may provide communication between the electronic device 401 and the external device 470 (for example, an HMT). For example, the communication interface 460 may be connected to a network (not shown) via wired and/or wireless communication to communicate with the external device 470. The wireless communication may include at least one of Wireless Fidelity (WiFi), Bluetooth (BT), Near Field Communication (NFC), a Global Positioning System (GPS), or cellular communication (for example, LTE, LTE-A, CDMA, WCDMA, UMTS, WiBro, GSM, and the like). The wired communication may include at least one of a Universal Serial Bus (USB), a High Definition Multimedia Interface (HDMI), a Recommended Standard 232 (RS-232), or Plain Old Telephone Service (POTS).

The external device 470 may, for example, perform a function of an HMT by interworking with the electronic device 401. A communication interface or module (not shown) of the external device 470 may provide for communication with the electronic device 401 via the communication interface 460. The external device 470 may collect data, and the collected data may be transmitted to the electronic device 401 via the communication interface or module of the electronic device. The electronic device 401 may transmit data to the external device 470 via the communication interface 460. The external device 470 may exchange an interface with the electronic device 401, and, when the external device 470 and the electronic device 401 are connected (secured) with each other, a lens unit (not shown) of the external device 470 is located in front of the display 450 of the electronic device 401 and thus may provide an image provided by the display 450 to the user.

The calibration module 480 of the electronic device 401 or the calibration module 475 of the external device 470 may process at least part of data acquired from the other elements of the electronic device 401 (for example, the processor 420, the memory 430, the input and output interface 440, the communication interface 460, and/or the like), and provide the data to the user by various methods. For example, the calibration module 480, 475 may process sensor data collected in the electronic device 401 and/or sensor data collected in the external device 470. According to various example embodiments, the calibration module 480, 475 may be included in the external device 470 and/or the electronic device 401. Additional information regarding the calibration module 480, 475 will be provided with reference to FIG. 5.

Figure 5:
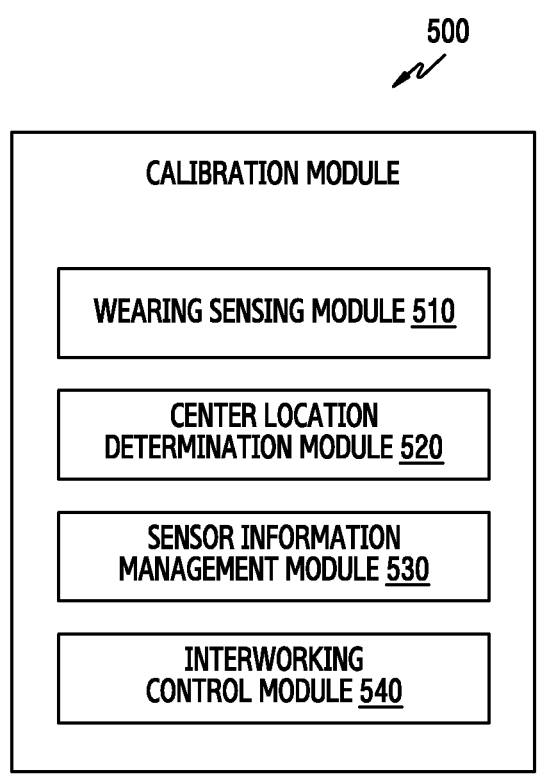
FIG. 5 is a block diagram showing an example calibration module.

FIG. 5 is a block diagram of an example calibration module.

Referring to FIG. 5, the calibration module 500 (for example, a sensor data calibration module) may include a wearing sensing module 510, a center location determination module 520, a sensor data management module 530, and an interworking control module 540.

The wearing sensing module 510 may use sensor data to determine whether the user is wearing the electronic device or not. For example, it may be determined whether the user wears the electronic device or not based on a proximity sensor input value.

The center location determination module 520 may calculate the center associated with a wearing location. For example, when the user wears the electronic device on the head, the center location determination module 520 may determine or calculate a head circumference of the user by combining sensor values of an HMT frame (not shown in FIG. 5). The center location determination module 520 may determine the center location of the head on which the user wears the electronic device based on the result of the calculating.

The sensor data management module 530 is a module which receives collected data and information on the center location of a wearing part from the sensor of the electronic device or the external device, and manages the data and the information. For example, the sensor data management module 530 may change a separate sensor center reference value or calibrate a reference value according to the center associated with a wearing location. In another example, the sensor data management module 530 may collect data of a sensor reference value measured separately from the center associated with the wearing location and provide the collected value in response to a request from other modules.

When the sensor value needs to be corrected based on at least one of the data or information collected in the sensor data management module 530, the interworking control module 540 may control at least one of the collected data or information to be collected when collecting sensor data. According to an example embodiment, when the electronic device is removed, the interworking control module 540 may calibrate the sensing reference point to change from the user body-based sensing reference point (for example, the calibrated center) back to the electronic device-based sensing reference point.

According to an example embodiment described in the present disclosure, the electronic device may include another device which may be mounted on a part of the user's body or combined with the electronic device. By way of example and without limitation, the electronic device may include a device which can be used independently and is wearable on a part of the user's body (for example, a wearable device, an HMT). The example electronic device may include a device which can be used independently and combined with another external device (for example, an HMT) to be worn on a part of the user's body and used (for example, a smartphone). According to an example embodiment, the electronic device may include a device which can be combined with another device such as a smartphone and used (for example, an HMT). The electronic device may be operated by a processor (for example, the processor 420 of FIG. 4 or an application processor 1510 of FIG. 15) including a function corresponding to the calibration module 480, 500 or at least one relevant module, as explained above with reference to FIGS. 4 and 5.

According to an example embodiment of the present disclosure, the electronic device includes: a sensor; a memory; and a processor operatively coupled with the sensor and the memory. When a change in a sensing reference point for acquiring sensor data is sensed, the processor may determine a center point for calibrating the sensing reference point, calibrate the sensing reference point to correspond to the determined center point, and acquire sensor data with reference to the calibrated sensing reference point.

According to an example embodiment, the processor may determine the center point according to whether the electronic device is worn by a user or removed from the user, and the center point may be located outside the electronic device or at a center of the electronic device according to whether the electronic device is worn or not. The processor may determine whether the electronic device is worn or not based on sensing data sensed by a sensor (e.g., a proximity sensor), may set, as the sensing reference point, a center point of a part of a user body on which the electronic device is worn in response to sensing that the electronic device is worn, and may set a center point of the electronic device as the sensing reference point in response to sensing that the electronic device is removed. The processor may collect body data of the user's body part, calculate the center point of the part of the user body on which the electronic device is worn based on the collected body data, and set the calculated center point as the sensing reference point.

According to an example embodiment, the processor may calculate the center point using at least one of an average value or a median value of a circumference of the part of the user body on which the electronic device is worn, and the sensing reference point may include a center or a rotation axis of the part of the user body on which the electronic device is worn. The sensor may sense a change in at least one of rotation, movement, location, velocity, acceleration, gyro, and tilt.

According to an example embodiment, when sensing that the electronic device is worn, the processor may change the sensing reference point from the center point of the electronic device to the center point of the part of the user body on which the electronic device is worn, and sense based on the changed center point of the part of the user body. When sensing that the electronic device is removed, the processor may change the sensing reference point from the center point of the part of the user body to the center point of the electronic device, and sense based on the changed center point of the electronic device. The processor may collect, by the sensor, sensor data with reference to the calibrated sensing reference point, and reprocess the collected sensor data with reference to the calibrated sensing reference point.

Hereinafter, non-limiting methods and apparatuses for acquiring data of a sensor with reference to a part of a user's body on which a wearable electronic device is worn are described.

Figure 6A:
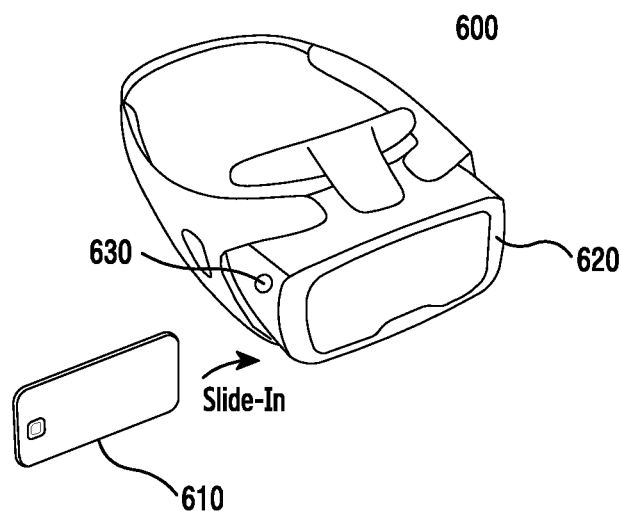
FIGS. 6A and 6B are views showing examples of an electronic device.
Figure 6B:
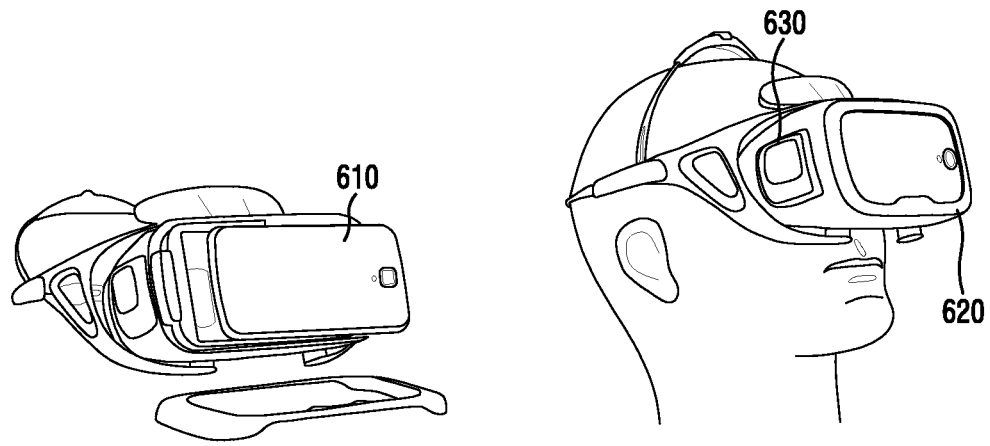

FIGS. 6A and 6B are views showing examples of an electronic device.

Referring to FIGS. 6A and 6B, the electronic device 600 may be a combination of a first electronic device 610 (for example, a smartphone) and a second electronic device 620 (for example, an HMT) (hereinafter, the combination is referred to as an electronic device or an HMT).

As shown in FIGS. 6A and 6B, the first electronic device 610 may be a terminal which can be used independently and is also wearable. According to an example embodiment, the first electronic device 610 may be connected with (secured to) the second electronic device 620 by being mounted in a frame of the second electronic device 620. The electronic device 600 may show the effect like an HMD using a display of the first electronic device 610 connected with the frame. According to an example embodiment, the second electronic device 620 (for example, an HMT) may be worn on the head, for example. Alternatively, the second electronic device 620 may be worn on other parts of the body such as a wrist (e.g., as a band), a finger (e.g., as a ring), a foot (e.g., as a shoe or a part thereof), etc.

Referring to FIGS. 6A and 6B, the electronic device 600 (a combination of the first electronic device 610 and the second electronic device 620) may include a control device 630 formed on the side surface of the second electronic device 620 to control the electronic device 600. The control device 630 may include at least one of a touch panel, a button, a wheel key, and/or a touch pad.

The touch panel may receive a touch input of the user. The touch input may include a direct touch and a hovering input by the user. The first electronic device 610 and the second electronic device 620 may be connected with each other using an interface such as a Universal Serial Bus (USB). The first electronic device 610 may receive the touch input received by the touch panel of the second electronic device 620 via the interface. The first electronic device 610 may control a function in response to the touch input received by the touch panel. For example, the first electronic device 610 may adjust volume of a speaker or reproduce an image on a display in response to the touch input.

Figure 7A:
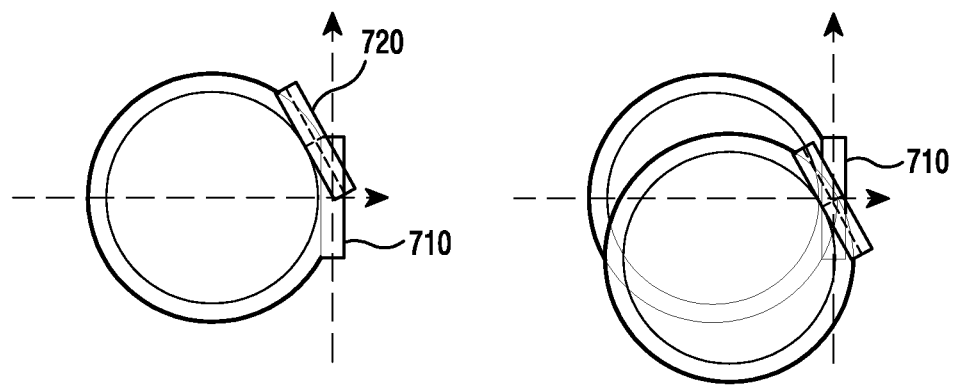
FIGS. 7A and 7B are views used to explain a change in a sensing reference point of a sensor in an electronic device.
Figure 7B:
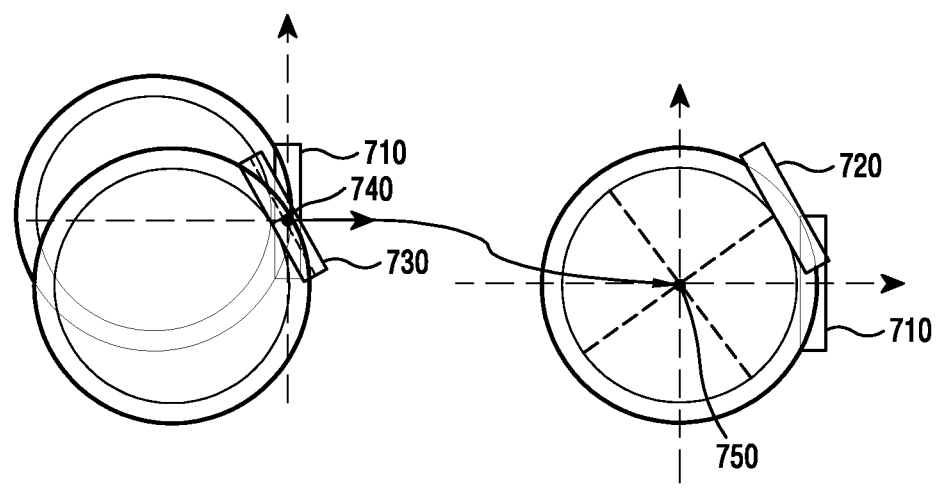

FIGS. 7A and 7B are views for explaining a change in a sensing reference point of a sensor in an electronic device according to various example embodiments of the present disclosure.

Referring to FIG. 7A, motion may be generated by the user when the user wears the electronic device. For example, when the user turns from direction 710 to direction 720 (for example, the user turns his/her head to the left) while wearing the electronic device, the electronic device also moves from direction 710 to direction 720. In this case, there may be a difference between the motion with reference to the center of the user and the motion with reference to the center of the electronic device. Thus, a sensor value based on the user's motion may cause a wrong result due to a misaligned axis. For example, when the real motion is generated by the user as shown in the left-side portion of FIG. 7A and a sensing center (reference point) for determining the motion is based on the center of the electronic device, a real measurement value may be shown as in the right-side view of FIG. 7A. That is, exact sensing data may not be acquired and thus an error may be caused.

FIG. 7B illustrates motion made with reference to the center of the electronic device. When motion is measured with reference to the center of the electronic device, and the user turns from direction 710 to direction 720 (for example, the user turns his/her head to the left), the electronic device moves from direction 710 to direction 720. The electronic device may recognize only a change in the angle caused by the motion (rotation) without considering a change in the location caused by the motion (rotation). Therefore, when the sensing reference point of the sensor is calibrated with reference to the center of the electronic device, the electronic device displays a screen based on a change in the direction at location 730. However, since the real location of the electronic device is changed to 720 by the user's motion as described above, there may be a difference in the screen between locations 720 and 730.

Accordingly, the user recognizes the field of view that the user should recognize at location 720 at location 730.

Therefore, in the present disclosure, the center point of the sensor (for example, a sensing reference point) is calibrated to be based on the center of the user wearing the electronic device, rather than the center of the electronic device. For example, in the present disclosure, a process of placing (changing or calibrating) a reference point 740 based on the center of the electronic device to a reference point 750 based on the center of the user is performed.

Figure 8:
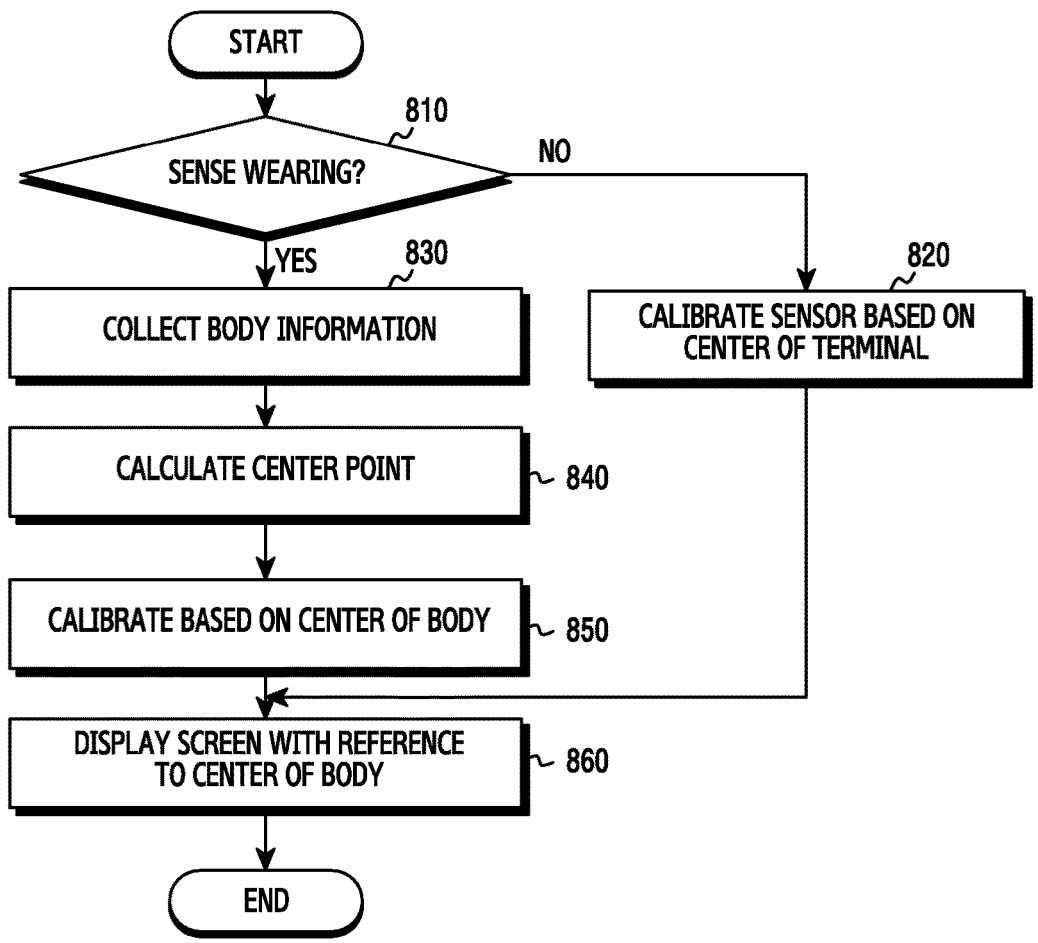
FIG. 8 shows an illustrative process of calibrating a sensing reference point based on a center of a user in an electronic device according to an example embodiment.

FIG. 8 illustrates a view showing an operation of an electronic device according to an example embodiment of the present disclosure.

Referring to FIG. 8, in step 810, the electronic device senses wearing of the electronic device by a user. For example, the electronic device (for example, the wearing sensing module 510 of FIG. 5) may sense whether it is worn on the user through a proximity sensor and/or other sensor(s). When the electronic device senses wearing by a user, the electronic device proceeds to step 830 to perform a center point calibration process. When the electronic device does not sense wearing by a user, the electronic device proceeds to step 820 to calibrate a reference point of a sensor with reference to the center of the terminal.

In step 830, the electronic device collects body data. For example, the electronic device may identify body data of the user by measuring or determining the circumference of the body part (e.g., head, leg, arm, etc.) through a connection part connecting the user's body and the electronic device, or through pre-stored user data.

In step 840, the electronic device (for example, the center location determination module 520 of FIG. 5) may calculate or sense a center point of the body (for example, a center location of the part of the user wearing the electronic device). The electronic device may calculate the center point of the body through an average value or a median value of the collected body data. In addition and/or alternatively, the electronic device may identify the center point value of the user through pre-stored user data.

In step 850, the electronic device (for example, the sensor data management module 530) may change the reference point of the electronic device to the calculated center point of the user (for example, may calibrate the center of the sensor to correspond to the center of the wearing part (e.g., head, leg, arm, etc.) of the electronic device).

In step 860, the electronic device may display a screen with reference to the changed reference point. The user-based reference point is different from the electronic device-based reference point regarding a reference location, and thus there is a difference in the screen displayed by the electronic device.

According to various example embodiments, when the electronic device is removed from the user, the electronic device (for example, the interworking control module 540 of FIG. 5) may calibrate the sensing reference point to change from the user-based sensing reference point (for example, the calibrated center) back to the electronic device-based sensing reference point.

Figure 9A:
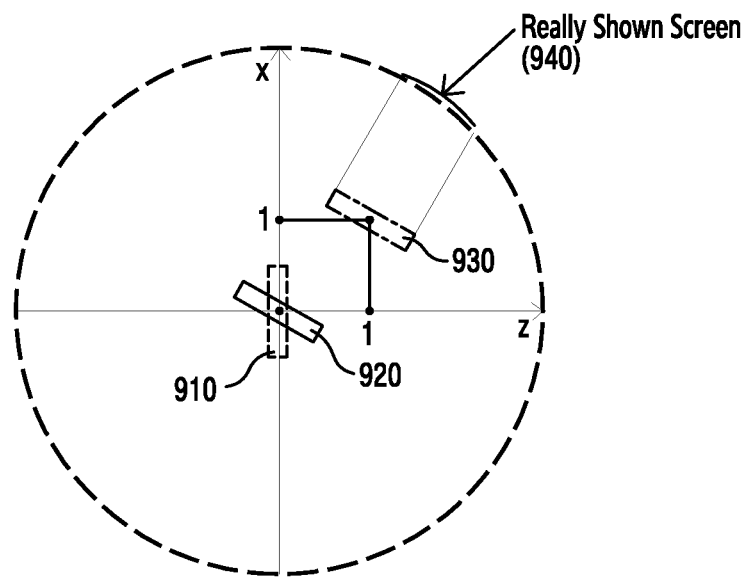
FIGS. 9A and 9B are views used to explain a difference in screens between an electronic device-based sensing reference point and a user-based sensing reference point.
Figure 9B:
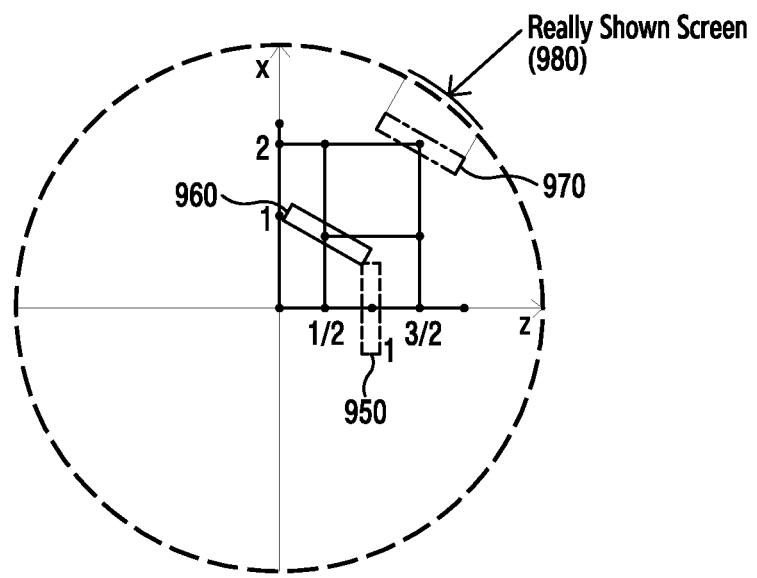

FIGS. 9A and 9B illustrate views showing a difference in screens between an electronic device-based sensing reference point and a user-based sensing reference point according to an example embodiment of the present disclosure.

According to an example embodiment, the electronic device may provide more exact and/or accurate data to the user by considering both rotation and movement of the electronic device. For example, assume that the radius of a user's head is 1, and, with reference to the user's head, a horizontal direction corresponds to the x-axis, a vertical direction corresponds to the y-axis, and a forward and backward direction corresponds to the z-axis. Based on this assumption, FIGS. 9A and 9B illustrate views showing a screen displayed to the user when the user moves in the directions of x, y, and z axes by (1,0,1), and turns the user's head by 60 degrees (rotation) with reference to the y-axis. For example, FIG. 9A shows an example of a screen which is displayed when the motion is calculated with reference to the center of the electronic device as in an existing method, and FIG. 9B shows an example of a screen which is displayed when the reference point is calibrated with reference to the user's head.

As shown in FIG. 9A, it is assumed that the electronic device is rotated by a predetermined angle at initial location 910 (for example, a reference location) (for example, rotation location) and moves in the directions of the z and x-axes without changing (moving) in the direction of the y-axis (for example, moved by (1, 0, 1). For example, when the electronic device is rotated with reference to the center of the electronic device, the electronic device has its direction changed by the rotation as indicated by 920, but does not have its location changed. When the electronic device has its direction changed (rotated) with reference to the center of the electronic device and has its location changed by (1, 0, 1), the electronic device is located at location 930 (for example, a rotation and movement location). In this case, the screen shown through the display of the electronic device is indicated by 940.

As shown in FIG. 9B, it is assumed that the electronic device is rotated by a predetermined angle at initial location 950 (for example, a reference location) (for example, a rotation location) and moves in the directions of the z and x-axes without changing (moving) in the direction of the y-axis (for example, moves by (1, 0, 1)). For example, when the electronic device is rotated by a predetermined angle with reference to the center of the user, the direction of the electronic device changes and its location also changes as indicated by 960 (for example, a rotation location). In this case, when the electronic device moves in the directions of the z and x-axes by (1, 0, 1), the electronic device is located at location 970 (for example, a rotation and movement location). In this case, the screen shown through the display of the electronic device is indicated by 980.

When the user's real movement and rotation are simultaneously considered, the reference point may be changed (moved). This will be explained with reference to FIGS. 9A and 9B. For example, comparing FIGS. 9A and 9B, the rotation angle and direction, and the movement distance are the same, but a different screen is shown. According to an example embodiment, the electronic device moves by the same distance of (1, 0, 1) and rotates by the same amount of 60° in FIGS. 9A and 9B, but different screens are displayed. That is, when the electronic device is rotated with reference to the center of the user, not only the direction of the electronic device but also the location of the electronic device is changed, and thus, the final locations of the electronic devices are different as shown in FIGS. 9A and 9B. Therefore, there is a difference in the displayed screens of FIGS. 9A and 9B.

An existing method does not consider both movement and rotation and reflects a user's motion on the screen using only a single value. According to an example embodiment, when a spherical panorama image like a street view is provided to the user, the image is displayed by considering only an angular velocity which does not change according to a center (without considering a user's head movement). However, this method may cause a difference between a real image shown on a screen and a calculated image, thereby causing motion sickness to the user.

Therefore, according to an example embodiment of the present disclosure, the electronic device makes the reference location consistent with the center of the user rather than the center of the electronic device, applies movement along with the angular velocity, calculates a detailed direction of the user, and displays an appropriate screen. According to an example embodiment, the method may include a method of calibrating the center using data collected in the electronic device (for example, a smartphone), and a method of transmitting a location value of the center or a measurement value for calculating the location of the center from the second electronic device (for example, an external device, an HMT) to the first electronic device (for example, a smartphone) connected with the second electronic device, along with a sensor value, and applying to the first electronic device. According to various example embodiments, the location of the center may be calculated based on data collected through a tightening device (not shown) of a wearing part of the second electronic device (for example, an HMT).

Figure 10:
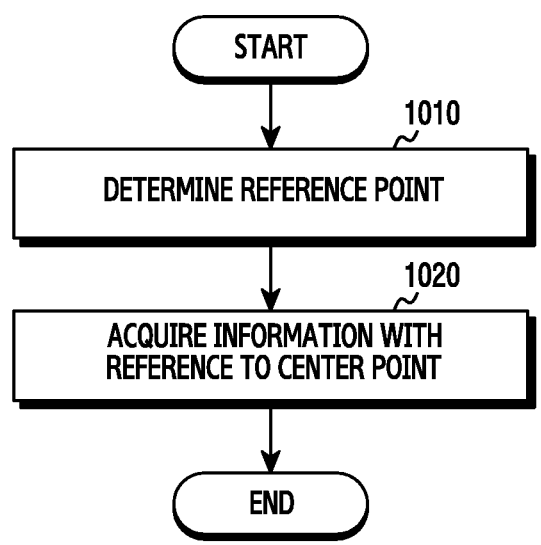
FIG. 10 illustrates a user center-based sensing method according to an example embodiment.

FIG. 10 illustrates a user center-based sensing method according to an example embodiment of the present disclosure.

Referring to FIG. 10, in step 1010, the electronic device may determine a center point of a mounted part. The electronic device may measure (or otherwise determine) the circumference of the mounted part (for example, a head circumference) and calculate a center point of the mounted part using an average value or a median value of the measured circumference. Alternatively, the electronic device may identify the center point value of the user through pre-stored data or user-entered data. The mounted part may include a user's body and a part of a place which is mounted on a specific tool.

In step 1020, the electronic device may acquire data from a sensor with reference to the center point of the mounted part. The electronic device may change the reference point to the center point of the user, and perform control with reference to the changed reference point. The user center-based reference point may differ from the electronic device-based reference point in view of a reference location, and thus there may be a difference in controlling the electronic device.

According to an example embodiment, the process of calibrating the reference point may be performed by the electronic device identifying a user center point, calculating a difference between a current center point and the user center point, and then changing the reference point based on the difference. The electronic device may sense with reference to the changed reference point of the sensor (e.g., in a user frame of reference), and correct a resulting value of the sensing with reference to the changed reference point. According to an example embodiment, the electronic device may set a user-based reference point as a new sensing reference point, and sense with reference to the set sensing reference point and acquire data. In addition, the electronic device may sense and then acquire sensor data by applying the difference between the user-based reference point and the center point of the sensor to the resulting value of the sensing.

The above-described processes may further include a process of calibrating the sensing reference point to change from the user-based sensing reference point back to the electronic device-based sensing reference point (e.g., to the device frame of reference) when the user removes the electronic device.

Figure 11A:
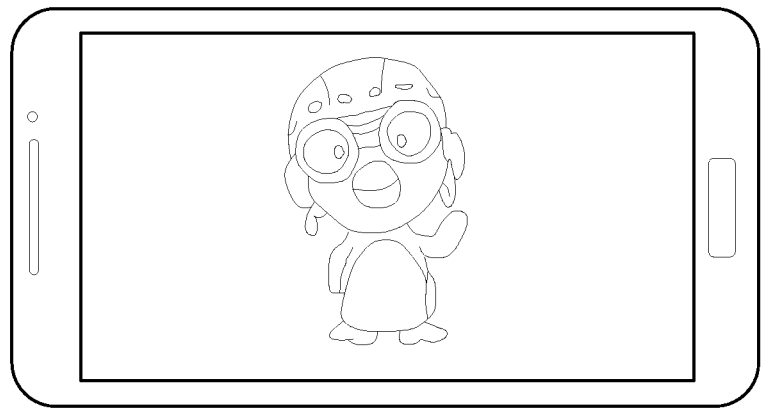
FIGS. 11A and 11B are views showing examples of an operation in a normal mode and a Head-Mounted Mode (HMM) in an electronic device according to an example embodiment.
Figure 11B:
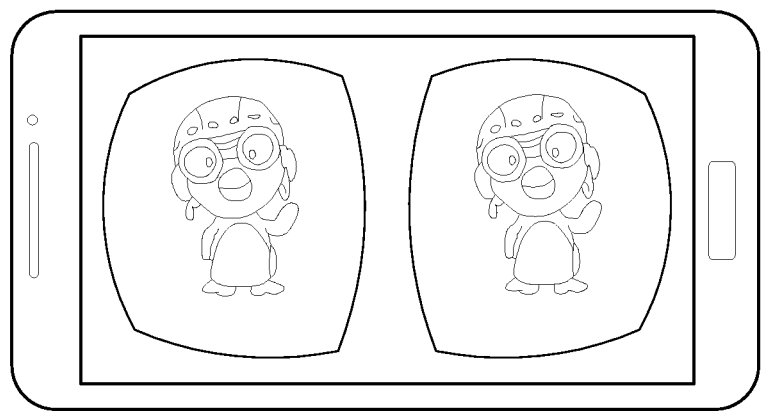

FIGS. 11A and 11B are views showing examples of an operation in a normal mode and an HMM in an electronic device according to an example embodiment of the present disclosure.

FIG. 11A illustrates a screen display when the electronic device (for example, a smartphone) is operated in the normal mode, and FIG. 11B illustrates a screen display when the electronic device is operated in the HMM or a Virtual Reality (VR) mode.

According to an example embodiment, the HMM or the VR mode may be converted from the normal mode when the electronic device is mounted on an external device through a frame of the external device (for example, an HMT) and interworks with the external device. In the HMM or the VR mode, a single image may be divided into two images. According to an example embodiment, since the HMM or the VR mode may cause distortion in the image due to a lens included in the external device, a planar image may be inversely distorted according to characteristics of a lens to provide an undistorted image to the user.

The sensing with reference to the user center according to an example embodiment of the present disclosure may be applied to the electronic device which provides the HMM or the VR mode, and may provide a service to the user. Accordingly, when the electronic device displays an image, the electronic device may display the image with reference to the user center-based sensing reference point.

Figure 12A:
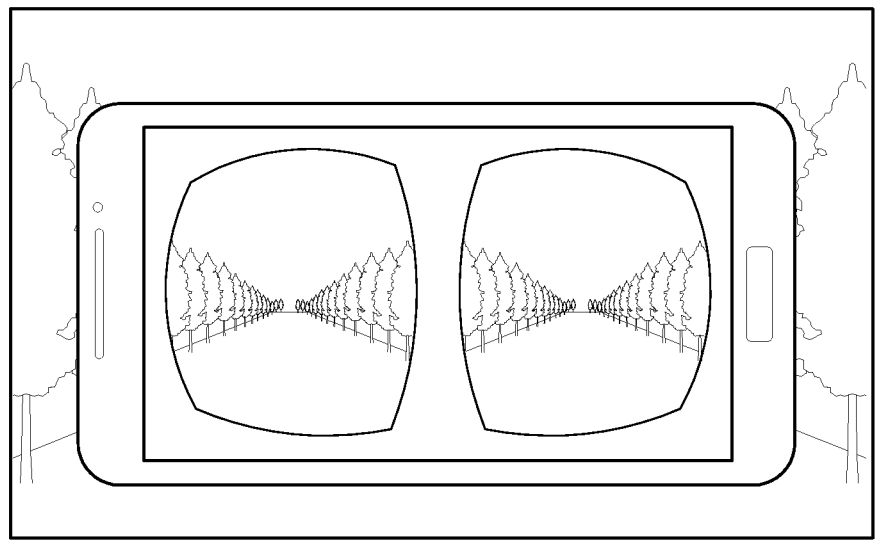
FIGS. 12A and 12B are views showing examples of an operation in a see-through mode and a Picture In Picture (PIP) mode in an electronic device according to an example embodiment.
Figure 12B:
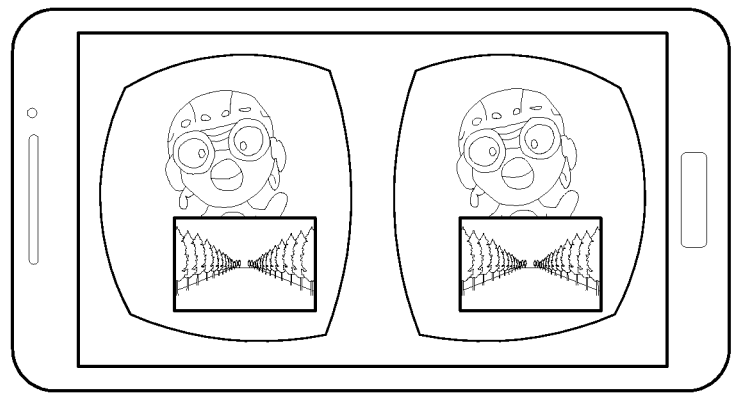

FIGS. 12A and 12B are views showing an example of an operation in a see-through mode and a PIP mode in an electronic device according to an example embodiment of the present disclosure.

According to an example embodiment, the electronic device (for example, a device which combines a smartphone and an HMT) may provide a see-through mode using a rear camera of a first electronic device (for example, a smartphone). The see-through mode may refer to a mode in which a screen of a real world in front of the user, which is acquired through the rear camera of the first electronic device, is displayed through a display of the electronic device.

According to an example embodiment, the method for providing the see-through mode may execute the rear camera of the first electronic device when the user presses a conversion button which is set to convert from the VR mode into the see-through mode (for example, a conversion button set in the first electronic device or the second electronic device). In this case, a preview screen of the rear camera may be displayed on a certain area of an existing VR screen in the form of PIP (for example, FIG. 12B), or the VR screen may be converted into background and the preview screen of the camera may be extended to the full area and displayed (for example, FIG. 12B). Accordingly, the user may experience an external virtual environment and simultaneously identify a surrounding environment through the camera image when necessary.

According to an example embodiment of the present disclosure, the user center-based sensing may be applied to a terminal which provides the see-through mode or the PIP mode and provide a service and benefit to the user. Accordingly, when the terminal displays an image, the terminal may display the image with reference to the user center-based sensing reference point.

Figure 13:
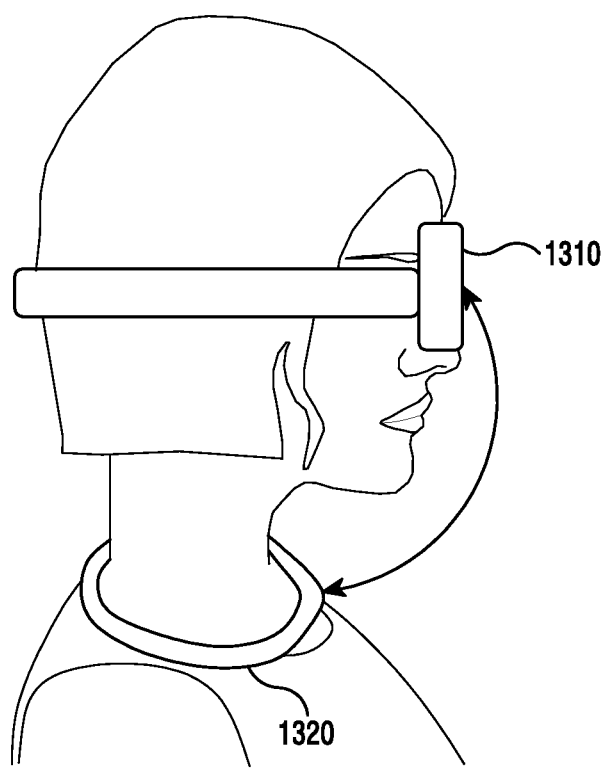
FIG. 13 is a view showing an example of an operation performed by interworking between electronic devices according to an example embodiment.

FIG. 13 illustrates a view showing an example of an operation by interworking between electronic devices according to various example embodiments of the present disclosure.

According to an example embodiment, the electronic device may be operated by interworking between a plurality of wearable electronic devices which sense with reference to a user. In FIG. 13, an HMT 1310 (an electronic device which combines a first electronic device and a second electronic device) (or an electronic device (for example, a smartphone)) interworks with a neck-wearable device 1320.

According to an example embodiment, the HMT 1310 and the neck-wearable device 1320 may sense with reference to the center of the user's body. According to an example embodiment, the HMT 1310 may determine the center of the user's head as a reference point for sensing, and the device 1320 may determine the center of the user's neck as a reference point for sensing. Compared with the case in which sensing is performed with reference to the center of each of the HMT 1310 and the device 1320, in the case in which sensing is performed with reference to the center of the user's body (for example, the center of the head and the center of the neck), a resulting value close to a user's real motion can be acquired. In the example embodiments of the present disclosure, the interworking between the two wearable devices is illustrated by way of an example, but two more wearable devices may interwork with one another.

Figure 14:
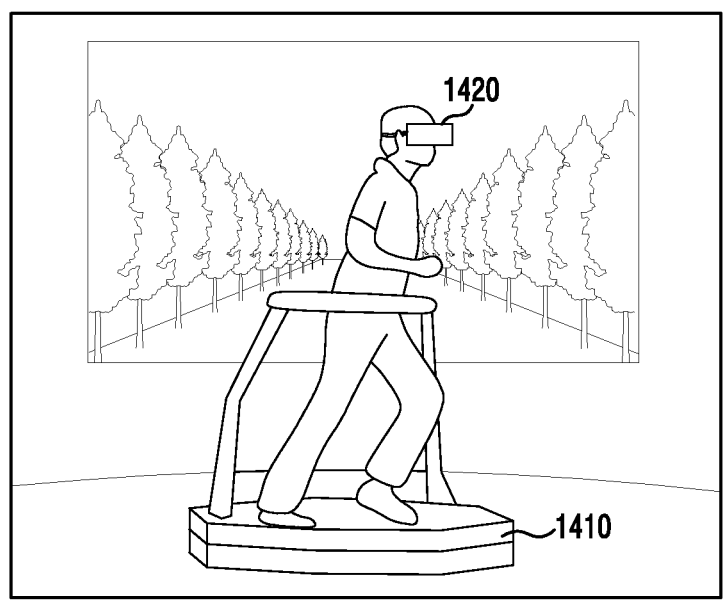
FIG. 14 is a view showing an example of utilization of an electronic device according to an example embodiment.

FIG. 14 illustrates a view showing an example of utilization of an electronic device according to various example embodiments of the present disclosure.

Referring to FIG. 14, an electronic device 1420 which senses with reference to a body may interwork with a running machine type device 1410 (e.g. a treadmill). The electronic device 1420 which senses with reference to the body may acquire motion data from the running machine type device 1410 and provide the data to the user. For example, when the user moves in place, there is no change in the user's location, but the electronic device 1420 which senses with reference to the body identifies the user's motion using operation data (for example, a speed of the running machine, etc.) of the running machine type device 1410 and the running machine type device 1410 forwards the data to the electronic device 1420, and the electronic device 1420 may provide the received data to the user. In addition, when the electronic device 1420 provides data by interworking with the running machine type device 1410, the electronic device 1420 may provide an image which changes according to a user's motion (running) through a display, and may provide data received from the running machine type device 1410 in the form of PIP or by overlaying the data on the image.

Figure 15:
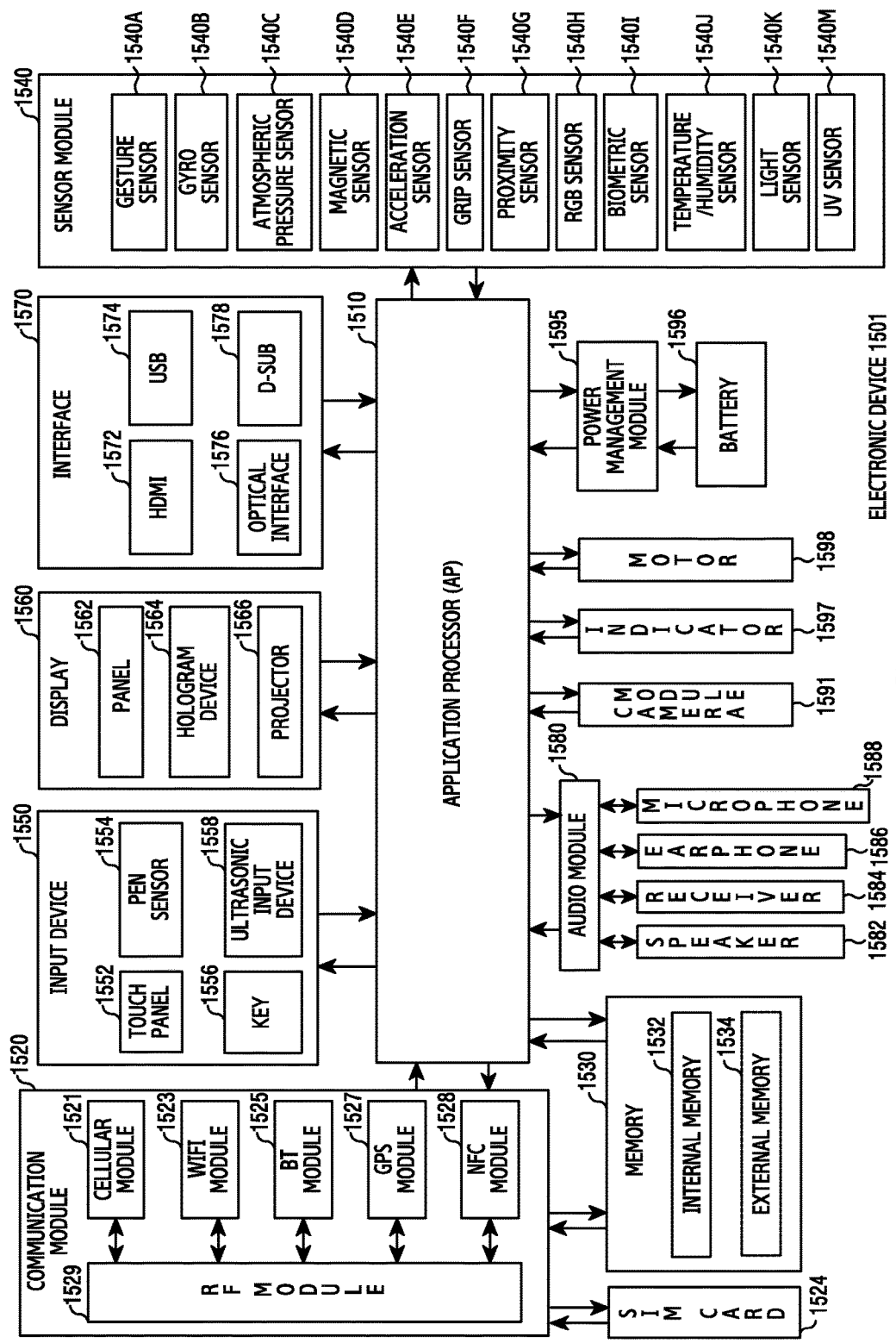
FIG. 15 is a block diagram of an electronic device according to an example embodiment.

FIG. 15 illustrates a block diagram of an electronic device according to an example embodiment of the present disclosure.

The electronic device 1501 may constitute, for example, the entirety or part of the electronic device 401 shown in FIG. 4, or may extend the configuration of the entirety or part of the electronic device 401.

Referring to FIG. 15, the electronic device 1501 may include at least one processor 1510, a communication module 1520, a Subscriber Identification Module (SIM) card 1524, a memory 1530, a sensor module 1540, an input device 1550, a display 1560, an interface 1570, an audio module 1580, a camera module 1591, a power management module 1595, a battery 1596, an indicator 1597, and/or a motor 1598.

The processor 1510 may be included in the electronic device 401 to perform a predetermined function (or functions) of the electronic device 401. According to an example embodiment, the processor 1510 may include one or more Application Processors (APs) and one or more Micro Controller Units (MCUs). According to another example embodiment, the processor 1510 may include one or more micro controller units as applications, or may be operatively connected to one or more micro controller units. In FIG. 15, the APs and the MCUs may be included in one IC package, or may be separately configured to be included in different IC packages, respectively. According to an example embodiment, the MCUs may be included in an IC package of the APs to be configured as one IC package together with the APs. Although the processor 1510 includes the APs or the MCUs, it is only an embodiment provided by way of example, and it will be readily apparent that the processor 1510 may also perform operations of the APs and/or the MCUs.

The APs may drive an operating system or an application program to control a plurality of hardware and/or software elements connected thereto, and may process various types of data including multimedia data and perform calculations. The APs may be implemented by, for example, a System on Chip (SoC). According to an example embodiment, the processor 1510 may further include a Graphic Processing Unit (GPU) (not illustrated).

The MCUs may be processors configured to perform a predetermined operation (or operations). According to an example embodiment, the MCUs may acquire sensing information through one or more specified motion sensors (e.g., a gyro sensor 1540B, an acceleration sensor 1540E, and/or a geomagnetic sensor (not illustrated)), compare the acquired sensing information, and determine the operating state of the specified sensor (e.g., the geomagnetic sensor) by making reference to a database of the electronic device 1501. In addition, although the MCUs and the elements of the sensor module 1540 are illustrated as separate elements in FIG. 15, the MCUs may be implemented to include at least some of the elements of the sensor module 1540 (e.g., at least one of the gyro sensor 1540B, the acceleration sensor 1540E, and the geomagnetic sensor).

According to an example embodiment, the APs and/or the MCUs may load instructions or data received from at least one of a non-volatile memory and other elements connected to each of the APs and the MCUs in a volatile memory, and may process the loaded instructions or data. Furthermore, the APs and/or the MCUs may store data received from or generated by at least one of the other elements in a non-volatile memory.

The communication module 1520 (e.g., the communication interface 460) includes communication circuitry and may perform data transmission/reception in communication between the electronic device 401 and the other electronic devices (e.g., the external device 470, or a server) connected thereto through a network. According to an example embodiment, the communication module 1520 may include a cellular module 1521, a Wi-Fi module 1523, a BT (Bluetooth) module 1525, a GPS module 1527, an NFC (near field communication) module 1528, and/or a Radio Frequency (RF) module 1529.

The cellular module 1521 may provide a voice call service, a video call service, a text message service, or an Internet service through a communication network (e.g., Long Term Evolution (LTE), LTE-A, Code Division Multiple Access (CDMA), Wideband CDMA (WCDMA), Universal Mobile Telecommunication System (UMTS), Wireless Broadband (WiBro), and/or Global System for Mobile communication (GSM)). Furthermore, the cellular module 1521 may distinguish between and authenticate electronic devices within a communication network using, for example, a subscriber identification module (e.g., the SIM card 1524). According to an example embodiment, the cellular module 1521 may perform at least some of the functions that the AP 1510 may provide. For example, the cellular module 1521 may perform at least some of the multimedia control functions.

According to an example embodiment of the present disclosure, the cellular module 1521 may include a Communication Processor (CP). Furthermore, the cellular module 1521 may be implemented by, for example, an SoC. Although the elements such as the cellular module 1521 (e.g., a communication processor), the memory 1530, and the power management module 1595 are illustrated to be separate from the AP 1510 in FIG. 15, the AP 1510 may include at least some of the aforementioned elements (e.g., the cellular module 1521) according to an example embodiment.

According to an example embodiment, the AP 1510 or the cellular module 1521 (e.g., the communication processor) may load instructions or data, received from a non-volatile memory or at least one of the other elements connected thereto, to a volatile memory and process the loaded instructions or data. Furthermore, the AP 1510 or the cellular module 1521 may store data received from or generated by at least one of the other elements in a non-volatile memory.

The Wi-Fi module 1523, the BT module 1525, the GPS module 1527, and the NFC module 1528 may include a processor for processing data transmitted/received through the corresponding module. In FIG. 15, the cellular module 1521, the WiFi module 1523, the BT module 1525, the GPS module 1527, and the NFC module 1528 are illustrated as separate blocks. However, according to an example embodiment, at least some (e.g., two or more) of the cellular module 1521, the WiFi module 1523, the BT module 1525, the GPS module 1527, and the NFC module 1528 may be included in one Integrated Chip (IC) or one IC package. For example, at least some (e.g., the communication processor corresponding to the cellular module 1521 and the WiFi processor corresponding to the WiFi module 1523) of the processors corresponding to the cellular module 1521, the WiFi module 1523, the BT module 1525, the GPS module 1527, and the NFC module 1528 may be implemented as one SoC.

The RF module 1529 may transmit/receive data, for example, RF signals. Although not illustrated in the drawing, the RF module 1529 may, for example, include a transceiver, a Power Amp Module (PAM), a frequency filter, a Low Noise Amplifier (LNA), or the like. In addition, the RF module 1529 may further include an element for transmitting/receiving electronic waves over free air space in wireless communication, for example, a conductor, a conducting wire, or the like. In FIG. 15, the cellular module 1521, the Wi-Fi module 1523, the BT module 1525, the GPS module 1527, and the NFC module 1528 share one RF module 1529. However, according to an example embodiment, at least one of them may transmit/receive an RF signal through a separate RF module.

The SIM card 1524 may be a card including a subscriber identification module, and may be inserted into a slot formed in a predetermined location of the electronic device. The SIM card 1524 may include unique identification information (e.g., an integrated circuit card identifier (ICCID)) or subscriber information (e.g., an international mobile subscriber identity (IMSI)).

The memory 1530 (e.g., the memory 430) may include an internal memory 1532 and/or an external memory 1534. The internal memory 1532 may include at least one of a volatile memory (e.g., a Dynamic Random Access Memory (DRAM), a Static RAM (SRAM), a Synchronous Dynamic RAM (SDRAM), or the like) or a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, or the like).

According to an example embodiment, the internal memory 1532 may be a Solid State Drive (SSD). The external memory 1534 may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 1534 may be functionally connected to the electronic device 1501 through various interfaces. According to an example embodiment, the electronic device 1501 may further include a storage device (or storage medium) such as a hard disc drive.

The sensor module 1540 may measure a physical quantity or sense an operating state of the electronic device 1501, and may convert the measured or sensed information into an electric signal. The sensor module 1540 may include at least one of, for example, a gesture sensor 1540A, a gyro sensor 1540B, an atmospheric pressure sensor 1540C, a magnetic sensor 1540D, an acceleration sensor 1540E, a grip sensor 1540F, a proximity sensor 1540G, a color sensor 1540H (e.g., red, green, and blue (RGB) sensor), a biometric sensor 1540I, a temperature/humidity sensor 1540J, an illumination (light) sensor 1540K, and an Ultra Violet (UV) sensor 1540M. Additionally or alternatively, the sensor module 1540 may, for example, include an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor (not illustrated), an iris sensor (not illustrated), a fingerprint sensor (not illustrated), and the like. The sensor module 1540 may further include a control circuit for controlling one or more sensors included therein.

The input device 1550 may include a touch panel 1552, a (digital) pen sensor 1554, a key 1556, and/or an ultrasonic input device 1558. The touch panel 1552 may detect a touch input in at least one of, for example, a capacitive type, a resistive type, an infrared type, and an acoustic wave type. The touch panel 1552 may further include a control circuit. In case of the capacitive type touch panel, physical contact or proximity detection is possible. The touch panel 1552 may further include a tactile layer. In this case, the touch panel 1552 may provide a user with a tactile reaction.

The (digital) pen sensor 1554 may be implemented, for example, using the same or a similar method to receiving a user's touch input or using a separate recognition sheet. The key 1556 may include, for example, a physical button, an optical key, and/or a keypad. The ultrasonic input device 1558 may identify data by detecting an acoustic wave with a microphone (e.g., a microphone 288) of the electronic device 201 through an input unit generating an ultrasonic signal, and may perform wireless detection. According to an example embodiment, the electronic device 201 may also receive a user input from an external device (e.g., a HMT, a wearable device, another electronic device, a computer or a server) connected thereto using the communication module 1520.

The display 1560 (e.g., the display 450) may include a panel 1562, a hologram device 1564, or a projector 1566. The panel 1562 may be, for example, a Liquid Crystal Display (LCD), an Active Matrix Organic Light Emitting Diode (AM-OLED), or the like. The panel 1562 may be implemented to be, for example, flexible, transparent, or wearable. The panel 1562 may be formed as a single module together with the touch panel 1552. The hologram device 1564 may show a three dimensional image in the air using an interference of light. The projector 1566 may display an image by projecting light onto a screen. The screen may be located, for example, in the interior of or on the exterior of the electronic device 1501. According to an example embodiment, the display 1560 may further include a control circuit for controlling the panel 1562, the hologram device 1564, and/or the projector 1566.

The interface 1570 may include, for example, a High-Definition Multimedia Interface (HDMI) 1572, a Universal Serial Bus (USB) 1574, an optical interface 1576, and/or a D-subminiature (D-sub) 1578. The interface 1570 may be included in, for example, the communication interface 460 illustrated in FIG. 4. Additionally or alternatively, the interface 1570 may include, for example, a Mobile High-definition Link (MHL) interface, a Secure Digital (SD) card/Multi-Media Card (MMC) interface, and/or an Infrared Data Association (IrDA) standard interface.

The audio module 1580 may bilaterally convert a sound and an electrical signal. At least some elements of the audio module 1580 may be included in, for example, the input/output interface 440 illustrated in FIG. 4. The audio codec 1580 may process voice information input or output through, for example, a speaker 1582, a receiver 1584, earphones 1586, and/or the microphone 1588.

The camera module 1591 is a device for capturing still and moving images, and may include one or more image sensors (e.g., a front sensor and/or a rear sensor), a lens (not illustrated), an image signal processor (ISP, not illustrated), and/or a flash (e.g., an LED or a xenon lamp, not illustrated) according to an example embodiment.

The power management module 1595 may manage the power of the electronic device 1501. Although not illustrated, the power management module 1595 may include, for example, a Power Management Integrated Circuit (PMIC), a charger Integrated Circuit (IC), or a battery or fuel gauge. According to various example embodiments, the PMIC may be mounted to an integrated circuit or an SoC semiconductor. Charging methods may be classified into a wired charging method and a wireless charging method. The charger IC may charge a battery and may prevent an over-voltage or over-current from being introduced from a charger.

According to an example embodiment, the charger IC may include a charger IC for at least one of the wired charging and the wireless charging. Examples of the wireless charging may include magnetic resonance charging, magnetic induction charging, and electromagnetic charging, and an additional circuit, such as a coil loop, a resonance circuit, and a rectifier, may be added for the wireless charging.

The battery gauge may measure, for example, a residual quantity of the battery 1596, and a voltage, a current, or a temperature while charging. The battery 1596 may store or generate electricity and may supply power to the electronic device 1501 using the stored or generated electricity. The battery 1596 may include, for example, a rechargeable battery and/or a solar battery.

The indicator 1597 may display a specific state of the electronic device 1501 or a part thereof (e.g., the AP 1510), for example, a boot-up state, a message state, or a state of charge (SOC). A motor 1598 may convert an electrical signal into a mechanical vibration. Although not illustrated, the electronic device 1501 may include a processing device (e.g., a GPU) for supporting mobile TV. The processing unit for supporting mobile TV may process, for example, media data pursuant to a certain standard of Digital Multimedia Broadcasting (DMB), Digital Video Broadcasting (DVB), or media flow.

Figure 16:
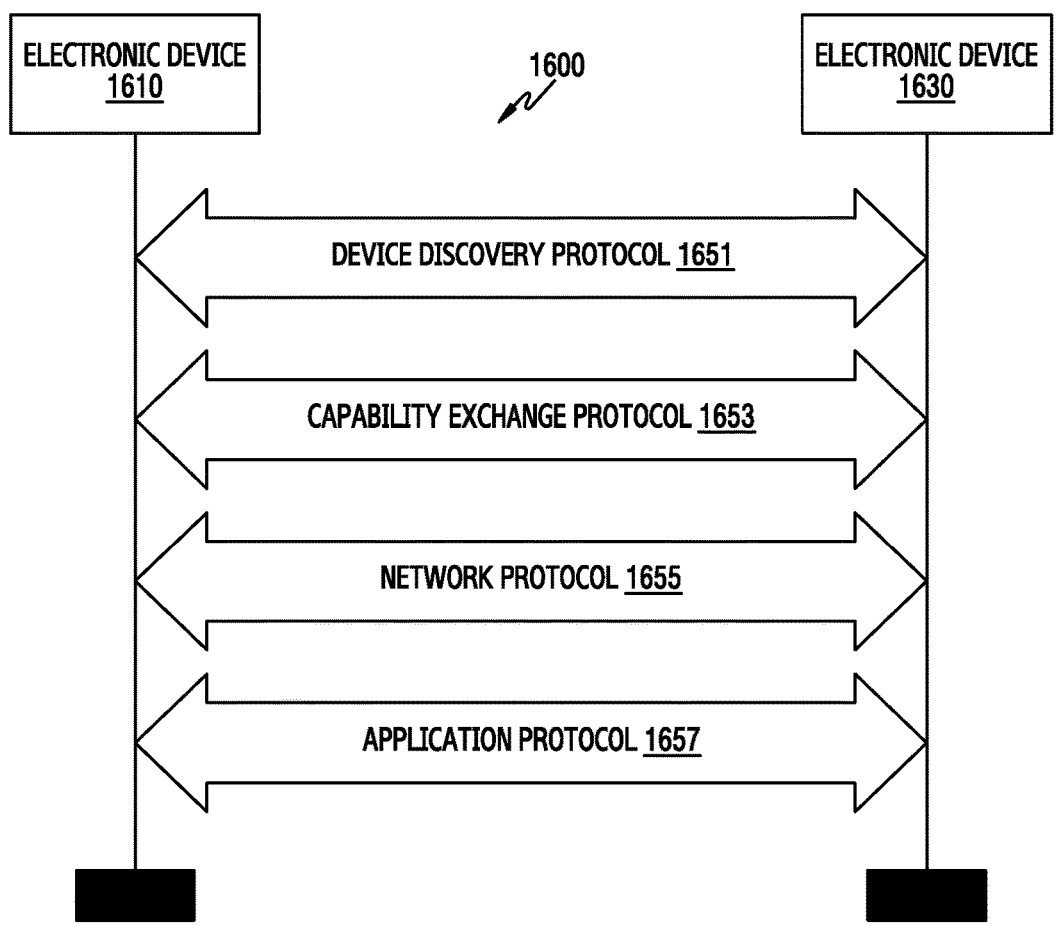
FIG. 16 illustrates an example communication protocol between a plurality of electronic devices according to an example embodiment.

FIG. 16 illustrates a view showing an illustrative communication protocol between a plurality of electronic devices according to an example embodiment of the present disclosure.

Referring to FIG. 16, the communication protocol 1600 may include a device discovery protocol 1651, a capability exchange protocol 1653, a network protocol 1655, and an application protocol 1657.

According to an example embodiment, the device discovery protocol 1651 may be a protocol for electronic devices (for example, an electronic device 1610 or an electronic device 1630) to sense external electronic device(s) that the electronic devices can communicate with, or to connect with the sensed external electronic devices. For example, the electronic device 1610 (for example, the electronic device 401, a smartphone) may sense the electronic device 1630 (for example, the external device 470, the wearable device 1320, the running machine type device 1410) as a device that the electronic device 1610 can communicate with, via a communication method usable in the electronic device 1610 (for example, WiFi, BT or USB, etc.) using the device discovery protocol 1651. The electronic device 1610 may acquire and store identification information on the sensed electronic device 1630 using the device discovery protocol 1651 to connect communication with the electronic device 1630. The electronic device 1610 may establish communication connection with the electronic device 1630 based on at least the identification information. According to an example embodiment, the electronic device 1610 (for example, a smartphone) may be mutually connected with the external device 470 (for example, an HMT) based on a pre-set communication method, and may sense, identify, or connect communication with the external device 470 based on the device discovery protocol 1651 when connecting to the external device 470.

According to an example embodiment, the device discovery protocol 1651 may be a protocol for mutually authenticating between the plurality of electronic devices. For example, the electronic device 1610 may perform authentication between the electronic device 1610 and the electronic device 1630 based on communication information for connecting with at least the electronic device 1630 (for example, a Media Access Control (MAC) address, a Universally Unique Identifier (UUID), Subsystem Identification (SSID), an Internet Protocol (IP) address).

According to an example embodiment, the capability exchange protocol 1653 may be a protocol for exchanging information related to a function or a service which is supported by at least one of the electronic device 1610 or the electronic device 1630. For example, the electronic device 1610 and the electronic device 1630 may exchange information related to the function or the service which is currently provided by each of the electronic devices via the capability exchange protocol 1653. The exchangeable information may include identification information which indicates a specific service from among a plurality of services supported in the electronic device 1610 and the electronic device 1630. For example, the electronic device 1610 may receive the identification information of the specific service provided by the electronic device 1630 from the electronic device 1630 via the capability exchange protocol 1653. In this case, the electronic device 1610 may determine whether the electronic device 1610 can support the specific service or not based on the received identification information.

According to an example embodiment, the network protocol 1655 may be a protocol for controlling a data flow which is exchanged between the electronic devices connected to communicate with each other (for example, the electronic device 1610, the electronic device 1630) to provide a service by interworking between the electronic devices, for example. For example, at least one of the electronic device 1610 or the electronic device 1630 may control an error or data quality using the network protocol 1655. Additionally or alternatively, the network protocol 1655 may determine a transmission format of data exchanged between the electronic device 1610 and the electronic device 1630. In addition, at least one of the electronic device 1610 or the electronic device 1630 may manage at least a session (for example, connects or terminates a session) for exchanging data with each other using the network protocol 1655. According to an example embodiment, the electronic device 1610 may be connected with the electronic device 1630 (for example, session connection) and may calibrate a sensing reference point for sensing with reference to the center of the user when determining that the electronic device is worn by the user. In addition, the electronic device 1610 may calibrate the sensing reference point to change from the user center-based sensing reference point back to the electronic device 1610-based sensing reference point when determining that the electronic device is removed from the user or determining that the connection with the electronic device 1630 is terminated (for example, session termination). For example, when the electronic device 1610 or the electronic device 1630 is removed from the user or disconnection between the devices is sensed (the device is disconnected), the electronic device 1610 or the electronic device 1630 may change the sensing reference point from the user center-based sensing reference point back to the electronic device-based sensing reference point, and acquire sensor data with reference to the changed sensing reference point (that is, the electronic device-based reference point).

According to an example embodiment, the application protocol 1657 may be a protocol for providing a procedure or information for exchanging data related to a service which is provided to an external electronic device. For example, the electronic device 1610 (for example, the electronic device 401) may provide a service to the electronic device 1630 (for example, the external device 470, another electronic device, or a server) via the application protocol 1657.

According to an example embodiment, the communication protocol 1600 may include a standard communication protocol, a communication protocol designated by an individual or a group (for example, a communication protocol autonomously designated by a communication device manufacturing enterprise or a network providing enterprise), or a combination of them.

Figure 17:
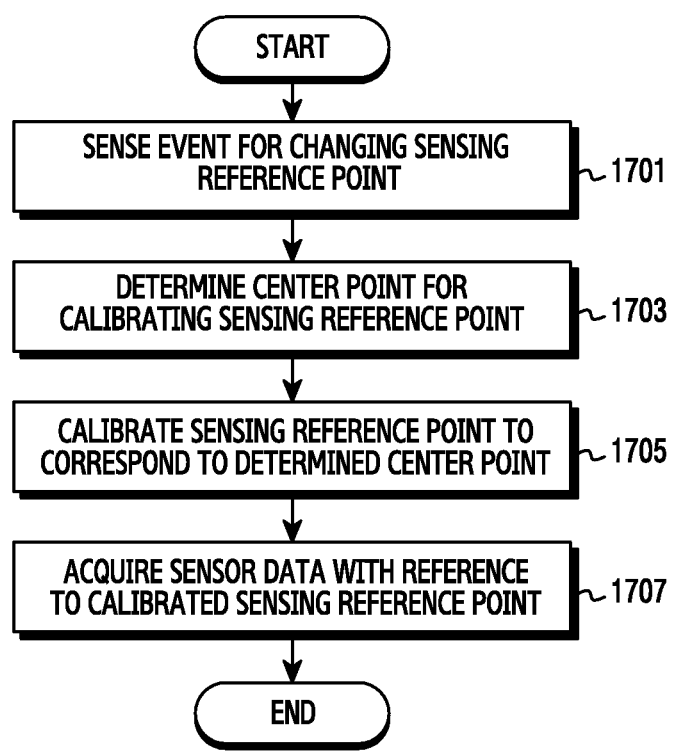
FIG. 17 is a flowchart showing an example operation method of an electronic device according to an example embodiment.

FIG. 17 is a flowchart showing an operation method of an electronic device according to an example embodiment of the present disclosure.

In FIG. 17, a device which performs the operation of FIG. 17 may include a device which can be used independently and is wearable on a part of a user's body (for example, a wearable device, an HMT). Alternatively, the device which performs the operation of FIG. 17 may include a device which can be used independently and combined with another external device (for example, an HMT) to be worn on a part of a user's body and used (for example, a smartphone). Alternatively, the device which performs the operation of FIG. 17 may include a device which is combined with another device like a smartphone and used (for example, an HMT). In FIG. 17, the above-described electronic device may be operated by a processor (for example, the processor 420 of FIG. 4, the application processor 1510 of FIG. 15) including a function corresponding to the calibration module 480, 500 or at least one relevant module, as described above with reference to FIGS. 4 and 5.

Referring to FIG. 17, in operation 1701, the electronic device may detect an event for changing a sensing reference point for acquiring sensor data. For example, the electronic device may sense whether the electronic device is worn on a part of a user's body or whether the electronic device is removed or not, and determine a change in the sensing reference point in response to sensing a change in the wearing state of the electronic device.

In operation 1703, the electronic device may determine a center point for calibrating the sensing reference point. According to various example embodiments, the center point may be located outside the electronic device or at the center of the electronic device. According to an example embodiment, the center point may be located at the center of the part of the user body on which the electronic device is worn when the electronic device is worn by the user. For example, the electronic device may measure (or otherwise determine) the circumference of the part of the user body on which the electronic device is worn, and may determine the center point with reference to the center or rotation axis of the measured circumference of the part of the user body. The electronic device may calculate the center point using at least one of an average value or a median value of the circumference of the part of the user body on which the electronic device is worn. According to another example embodiment, when the electronic device is removed from the user, the center point may be located at the center of the electronic device.

In operation 1705, the electronic device may calibrate the sensing reference point to correspond to the determined center point. According to an example embodiment, the electronic device may determine the center point of the part of the user body on which the electronic device is worn as the sensing reference point in response to sensing that the electronic device is worn. For example, the electronic device may collect body data of the part of the user body, calculate the center point of the part of the user body on which the electronic device is worn based on the collected body data, and set the calculated center point as the sensing reference point. According to another example embodiment, the electronic device may determine the center point of the electronic device as the sensing reference point in response to sensing that the electronic device is removed.

In operation 1707, the electronic device may acquire sensor data with reference to the calibrated sensing reference point. According to an example embodiment, the electronic device may change the sensing reference point from the center point of the electronic device to the center point of the part of the user body on which the electronic device is worn when sensing that the electronic device is worn, sense based on the changed sensing reference point (for example, the center point of the part of the user body), and then acquire sensor data resulting therefrom. According to another example embodiment, the electronic device may change the sensing reference point from the center point of the part of the user body to the center point of the electronic device when sensing that the electronic device is removed from the user, sense based on the changed sensing reference point (for example, the center point of the electronic device), and then acquire sensor data resulting therefrom.

According to various example embodiments, the electronic device may collect sensor data using a pre-set sensor with reference to the calibrated sensing reference point, and reprocess the collected sensor data with reference to the calibrated sensing reference point. For example, as described above with reference to FIG. 9, the electronic device may acquire sensor data based on the calibrated sensing reference point, and process an image display based on the acquired sensor data.

According to various example embodiments of the present disclosure as described above, the center of a sensor is calibrated differently according to a method or a location at which the user wears the electronic device, so that a better sense of use can be provided to the user. For example, the electronic device according to various example embodiments may calibrate the center of the sensor for acquiring sensing data differently according to whether the electronic device is worn on a part of a user body. According to various example embodiments, the electronic device may provide data sensed based on the result of the calibrating to the user, so that more exact data and a better sense of use can be provided to the user.

Various example embodiments executed by the electronic device 401 may be an operation that is performed by the control of a processor 420. In addition, the electronic device 401 may include a module, which is separate from the processor 420 and is programmed to control various example embodiments of the present disclosure. The separate module programmed to control various example embodiments of the present disclosure may be operated by the control of the processor 420.

Each of the above described elements of the electronic device according to various example embodiments of the present disclosure may include one or more components, and the name of a corresponding element may vary according to the type of electronic device. The electronic device according to various example embodiments of the present disclosure may include at least one of the above described elements and may exclude some of the elements or further include other additional elements. Further, some of the elements of the electronic device according to various example embodiments of the present disclosure may be coupled to form a single entity while performing the same functions as those of the corresponding elements before the coupling.

At least some of the devices or methods according to various example embodiments of the present disclosure as defined by the appended claims and/or disclosed herein may be implemented in the form of hardware, software, firmware, or any combination (e.g., module or unit) of at least two of hardware, software, and firmware. The "module" may be interchangeable with a term, such as a unit, a logic, a logical block, a component, or a circuit. The "module" may be a minimum unit of an integrated component element or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which are known or are developed hereinafter. If implemented in software, a computer-readable storage medium (or storage medium readable by a computer) storing at least one program (or programming module) may be provided. The software may, for example, be implemented by instructions stored in a computer-readable storage medium in the form of a programming module. The at least one program may include instructions that cause the electronic device to perform the methods according to various example embodiments of the present disclosure as defined by the appended claims and/or disclosed herein. When the command is executed by one or more processors (for example, the processor 420), the one or more processors may execute a function corresponding to the command. The computer-readable storage medium may be, for example, the memory 430. At least a part of the programming module may, for example, be implemented (e.g., executed) by the processor 420. At least a part of the programming module may, for example, include a module, a program, a routine, a set of instructions, or a process for performing at least one function.

The computer-readable storage medium may include magnetic media such as a hard disc, a floppy disc, and a magnetic tape; optical media such as a compact disc read only memory (CD-ROM) and a digital versatile disc (DVD); magneto-optical media such as a floptical disk; a hardware device specifically configured to store and execute program instructions (e.g., programming module), such as a read only memory (ROM), a random access memory (RAM), and a flash memory; an electrically erasable programmable read only memory (EEPROM); a magnetic disc storage device; any other type of optical storage device; and a magnetic cassette. Alternatively, any combination of some or all of the may form a memory in which the program is stored. Further, a plurality of such memories may be included in the electronic device.

In addition, the program may be stored in an attachable storage device capable of accessing the electronic device through a communication network such as the Internet, an intranet, a local area network (LAN), a wide LAN (WLAN), a storage area network (SAN), or any combination thereof. The storage devices may be connected to an electronic device through an external port. Further, a separate storage device on the communication network may access a portable electronic device. Any of the hardware devices as described above may be configured to work as one or more software modules in order to perform the operations according to various embodiments of the present disclosure, and vice versa.

Any of the modules or programming modules according to various example embodiments of the present disclosure may include at least one of the above described elements, exclude some of the elements, or further include other additional elements. The operations performed by the modules, programming module, or other elements according to various example embodiments of the present disclosure may be executed in a sequential, parallel, repetitive, or heuristic manner. Further, some operations may be executed according to another order or may be omitted, or other operations may be added.

The example embodiments of the present disclosure disclosed herein and shown in the drawings are merely specific examples presented in order to easily describe technical details of the present disclosure and to help the understanding of the present disclosure, and are not intended to limit the scope of the present disclosure. Therefore, it should be construed that, in addition to the example embodiments disclosed herein, all modifications and changes or modified and changed forms derived from the technical idea of the present disclosure fall within the scope of the present disclosure.

What is claimed is:

1. An electronic device comprising:
   a motion sensor configured to acquire sensing data with reference to a sensing reference point;
   a processor operatively coupled with the motion sensor; and
   a memory operatively coupled with the processor,
   wherein, the memory stores instruction for, when executed, causing the processor to:
   detect that the electronic device is worn on a part of a body of a user;
   in response to the detecting, change the sensing reference point from a first point corresponding to a center of the electronic device to a second point located outside the electronic device, the second point located in the part of the body of the user on which the electronic device is worn;
   acquire, using the motion sensor, sensor data with reference to the first point;
   calibrate, based on a difference between the first point and the second point, the sensor data acquired with reference to the first point, so that the calibrated sensor data corresponds to the second point; and
   process the acquired sensor data with reference to the changed sensing reference point to generate a screen for display on a display.

2. The electronic device of claim 1, wherein the processor is configured to collect body data of the part of the body of the user, calculate a center point of the part of the body of the user on which the electronic device is worn based on the collected body data, and set the calculated center point as the second point.

3. The electronic device of claim 1, wherein the processor is configured to calculate a center point of the part of the body of the user on which the electronic device is worn using at least one of an average value or a median value of a circumference of the part of the user body on which the electronic device is worn, and set the calculated center point as the second point, and
   wherein the second point is included in a rotation axis of the part of the user body on which the electronic device is worn.

4. The electronic device of claim 1, wherein the motion sensor senses a change in at least one of rotation, movement, velocity, acceleration, gyro, and tilt.

5. The electronic device of claim 1, wherein the electronic device comprises a device which is mountable on the part of the body of the user or another device which is combined with the electronic device.

* * * * *